Dec. 11, 1945.   G. A. TINNERMAN   2,390,752
FASTENING DEVICE
Filed Jan. 31, 1944
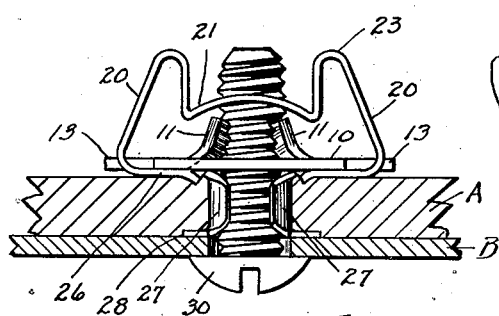
FIG. 1
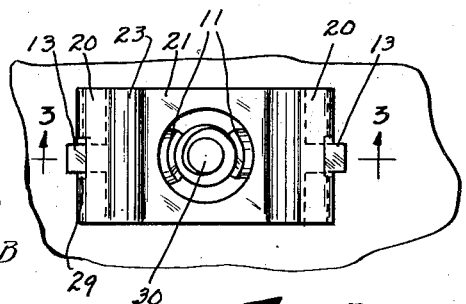
FIG. 2
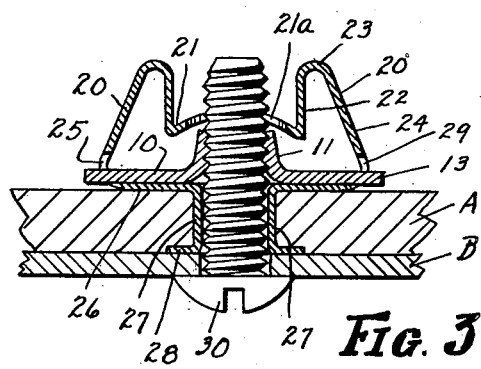
FIG. 3
FIG. 4
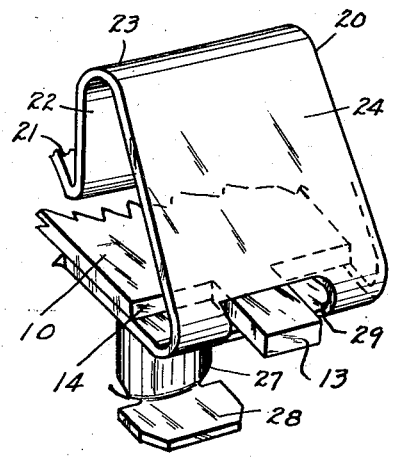
FIG. 5
INVENTOR.
GEORGE A. TINNERMAN
BY
ATTORNEYS Patented Dec. 11, 1945

2,390,752

UNITED STATES PATENT OFFICE 2,390,752

FASTENING DEVICE

George A. Tinnerman, Cleveland, Ohio, assignor to Tinnerman Products, Inc., Cleveland, Ohio, a corporation of Ohio.

Application January 31, 1944, Serial No. 520,448

9 Claims. (Cl. 85—32)

This invention relates to a nut combined with a cage adapted to attach it in proper position to a support so that it may be ready to receive the threaded shank of the screw bolt. One of the objects of the invention is to provide a device of this character in which the nut shall be capable of a limited shifting in its own plane with reference to the cage so that the bolt being mounted need not accurately align with the cage but will automatically reposition the nut as may be necessary when the bolt is inserted. This avoids the necessity for extreme accuracy in the positioning of the nut over the bolt opening and increases the speed with which the bolts may be mounted.

Another object is to enable the nut to be made of considerably heavier material than the cage, thus providing on the one hand a greater holding power for the nut, but on the other hand enabling the cage to be made of lighter stock.

Still another object is to enable the nut and cage while having requisite holding power to be able to be effectively constructed of non-ferrous metal and thus free from magnetic properties, so that the device may be used for instance adjacent to the compass of an airplane without interfering with the proper functioning of the compass.

My invention is illustrated in the accompanying drawing and is hereinafter more fully explained and the essential novel features are summarized in the claims.

In the drawing, Fig. 1 is a side elevation of my fastening device in place on a support; Fig. 2 is a plan thereof; Fig. 3 is a longitudinal section in a plane indicated by the line 3—3 on Fig. 2; Fig. 4 is a side elevation of the device before it is applied to the support; Fig. 5 is a fragmentary perspective of the device.

In each of the figures, 10 designates the nut and 20 the cage. In Figs. 1 and 2, 30 designates a screw bolt passing through the nut in the cage, while A indicates a supporting member in which the carrier is mounted and B an applied member against the supporting member by the screw bolt.

The nut 10 comprises a flat plate of material having a bolt opening with the material of the plate about the opening bent upwardly almost at a right angle but somewhat inclined toward the opening at two opposed regions, as indicated at 11. The two lips 11 which are diametrically opposite each other, are of concavo-convex formation and are formed with ribs 12 on their inner faces which extend in such direction that the ribs on the two sides combine to make a plurality of helical turns ccorresponding to the thread of the bolt. The plate 10 also has at its ends flat tongues 13 which lie in the plane of the strip and are centrally located and coact with the cage about to be described.

The cage 20 is a single strip of resilient sheet material bent on itself in various regions in a peculiar form so that it may coact with the support to hold itself in place and coact with the nut to retain it in approximate alignment with the opening through the support, while allowing the nut to shift slightly.

It is convenient to describe the cage with reference to the drawing, as having upwardly and downwardly extending parts but, of course, in actual use the so-called upwardly extending parts may extend downwardly or horizontaly and so on.

As shown in the drawing, this cage has an intermediate upwardly arched portion 21 with a central opening 21a. From the ends of this portion two parallel regions 22 extend upwardly. At the upper ends of these regions are formed integral return bends 23 leading to downwardly extending outwardly flaring portions 24. From the lower end of each portion 24 a bend 25 leads to an inwardly extending flat portion 26 which then turns downwardly in the form of an outwardly convex (inwardly concavo) leg 27 and finally flanged outwardly at 28. Through the bends 25 of the cage, I form openings 29.

When the device is assembled the flat body of the nut rests on the portions 26 of the cage with the tongues 13 of the nut extending through the openings 29 and with the ends of the nut at the sides of these tongues designated 14 standing spaced some distance within the bends 25.

The normal condition of the cage before it is applied is indicated in Fig. 4. The nut is readily mounted in the cage by slightly spreading the two legs and shoving the nut in from one side and allowing the cage to return to normal position with the tongues 13 occupying the openings 29.

In applying the device it is only necessary to compress the cage longitudinally to bring the downward legs 27 closed together after which the flanges 28 may be readily passed through an opening in a support, the legs thereafter springing apart to bring the flanges into engagement with the opposite face of the support, as indicated in Figs. 1 and 3.

When in position, the cage becomes locked to the support, while the nut member is held to the cage but may shift longitudinally by reason of the ends 14 being back from the cage bends and may shift laterally by reason of the width of the tongues 13 being less than the length of the openings 29. When the device is positioned therefore it is a simple matter to insert the bolt 30. If the nut is not strictly aligned with the bolt, the forward end of the bolt engaging the curve of the nut where the wings 11 spring from the base shifts the nut in its own plane in whatever direction is necessary to bring the interior of the nut into strict alignment with the axis of the bolt, so that the bolt may be turned home.

As the stresses are carried entirely by the flat nut bearing against the flat portions 26 of the cage which bear against the support, the cage may be of quite light material, merely strong enough and stiff enough to hold the nut approximately in place. The nut itself may be of greater thickness than the cage and may have its wings extend for a considerable distance from the base of the carrier and thus have several thread turns to receive the bolt and hold it with the requisite force.

Where it is desirable to avoid any possible interference with an adjacent compass or other magnetic device, I prefer to make the nut of brass and the cage of phosphor bronze. By allowing heavier material for the nut, I may obtain the requisite strength for it when made of brass, and the phosphor bronze for the cage may be of thin material and have the resilient character desired for mounting the device and at the same time sufficient rigidity so that the cage once mounted will hold the nut against the support in the absence of the bolt.

The construction described enables the fastening devices to be positioned in advance on the support ready to receive the bolts which at a later time may be readily turned in through openings in the device to be attached, no wrenches being required. Accordingly, this fastener may result in a material saving of time in the application of bolts to secure members in place. It is especially useful where the rear of the support is not readily accessible. It has been found, for instance, very satisfactory in the mounting of the instruments on the supporting panels of airplanes.

I claim:

1. A two-part fastening device comprising a cage and a nut, the cage having a transverse portion with an opening and having two portions extending relatively upwardly from said transverse portion and then relatively downwardly and then relatively inwardly and having a pair of spaced tongues adapted to occupy an opening in a support, whereby the cage may be positioned with its opening in axial registration with the opening of the support, said nut being mounted on the cage and loosely engaging the cage and thereby held against rotation while the nut may shift in its own plane on the cage.

2. A fastening device comprising a cage having an intermediate region with two resilient arms extending therefrom, extensions of said arms connected therewith by return bends to provide outwardly flaring portions, the other ends of such flaring portions being bent inwardly and then bent away from said intermediate region to provide free portions adapted to occupy an opening in a support and engage the wall of such opening under spring pressure, and a nut resting on the inwardly bent portions and having tongues at its ends extending into openings of the cage where the flaring portions join the inwardly bent portions.

3. A fastener comprising a cage having an intermediate concavo-convex region with substantially parallel extensions projecting from the opposite ends of the intermediate region, said extensions being connected by return bends with portions which extend diagonally outwardly and then inwardly and then turn away from the intermediate region to form legs free to be sprung inwardly and thereafter automatically spread apart by reason of the resilience of the material, and a sheet metal nut resting on the inwardly extending portions of the cage and having concavo-convex inwardly ribbed portions to provide a thread engager, said nut being formed at its ends with tongues which loosely occupy openings in the cage adjacent the connection of the diagonal portions with the inward portions thereof.

4. A fastening device comprising in combination a sheet metal nut having an opening and deformed material about the opening to provide a thread engager and tongues at the ends of the member and a cage made of a separate piece and having an intermediate region with a bolt opening and portions extending first upwardly from the intermediate region and then downwardly and then inwardly and then projecting downwardly to exted into an opening in the support, said nut resting on said inwardly projecting portions and having tongues at its ends extending into openings in the cage adjacent the junction of the downward portions and inward portions.

5. A fastener comprising a cage having an intermediate region with substantially parallel extensions projecting from the opposite ends of the intermediate region, said extensions being connected by return bends with portions which extend backwardly in spaced relation to said substantially parallel extensions and then inwardly and then turn away from the intermediate region to form legs free to be sprung inwardly and thereafter automatically spread apart by reason of the resilience of the material, whereby said free legs may obtain a binding action on a support by occupying an opening thereof, the intermediate region of the cage being provided with a bolt opening, and a sheet metal nut resting on the inwardly bent portions of the cage and interlocked with the cage.

6. The combination of a cage having two substantially flat portions adapted to seat against a support and two resilient arms connected together and to the outer ends of said substantially flat portions respectively to form a loop, and two arms projecting from the inner ends of said substantially flat portion and adapted to occupy an opening in the support, and a nut resting on the seating portions of the cage and loosely connected to said resilient arms, thereby allowing the nut to shift on said substantially flat portions.

7. A fastening device comprising a resilient cage having a loop with inward portions terminating in spaced projecting portions adapted to occupy an opening in a support, outward shoulders on the projecting portions adapted to engage the support to hold the cage in place thereon and a nut mounted within the loop of the cage and resting on the inward portions thereof and having shoulders loosely engaging it with the opening of the nut in approximate alignment with the opening in the support.

8. The combination of a cage comprising a strip of spring sheet material doubled on itself to provide two portions adapted to seat against a support, two arms extending relatively downwardly from the inner ends of said portions, and a loop extending relatively upwardly and connecting the outer ends of the portions, and a sheet metal nut resting on said portions, said nut having tongues at its ends loosely occupying openings in the cage adjacent the junctions of the looped portion of the cage with the said seating portions.

9. A fastening device comprising a cage formed with a central region, a pair of arms extending relatively upwardly from the ends of said region, said arms being formed into U-bends and then extending downwardly past said central region and then bent inwardly and having openings above the inwardly bent portions said arms then extending downwardly in spaced relation to occupy an opening in a support, and a nut resting on the inwardly bent portions and having projections loosely occupying the openings in the cage.

GEORGE A. TINNERMAN.